United States Patent
Farley et al.

(10) Patent No.: US 8,736,444 B2
(45) Date of Patent: May 27, 2014

(54) SYSTEM AND METHOD FOR WIRELESS HEAT DETECTION

(75) Inventors: Daniel G. Farley, Westminster, MA (US); Paul B. Rasband, Lantana, FL (US)

(73) Assignees: Tyco Fire & Security GmbH, Neuhausen am Rheinfall (CH); Sensormatic Electronics, LLC, Boca Raton, FL (US)

( * ) Notice: Subject to any disclaimer, the term of this patent is extended or adjusted under 35 U.S.C. 154(b) by 263 days.

(21) Appl. No.: 13/249,466

(22) Filed: Sep. 30, 2011

(65) Prior Publication Data

US 2013/0082839 A1  Apr. 4, 2013

(51) Int. Cl.
*G08B 1/08* (2006.01)

(52) U.S. Cl.
USPC .............. 340/539.27; 340/572.1; 340/539.26; 340/577

(58) Field of Classification Search
USPC .................................................... 340/539.27
See application file for complete search history.

(56) References Cited

U.S. PATENT DOCUMENTS

| | | | | |
|---|---|---|---|---|
| 6,133,828 A * | 10/2000 | Payne | | 340/506 |
| 8,242,903 B2 * | 8/2012 | Koyama | | 340/539.12 |
| 2007/0008099 A1 * | 1/2007 | Kimmel et al. | | 340/506 |
| 2007/0109121 A1 * | 5/2007 | Cohen | | 340/539.26 |
| 2008/0174424 A1 * | 7/2008 | Drake et al. | | 340/539.27 |
| 2008/0231438 A1 * | 9/2008 | Curcio | | 340/539.13 |
| 2008/0252455 A1 * | 10/2008 | McTigue | | 340/572.1 |
| 2011/0148620 A1 * | 6/2011 | McClure et al. | | 340/514 |

* cited by examiner

*Primary Examiner* — Kerri McNally
(74) *Attorney, Agent, or Firm* — Kacvinsky Daisak & Bluni PLLC (57) ABSTRACT

A system for wireless heat detection is disclosed. The system includes one or more heat sensors that convert sensed heat energy into electrical power for transmitting an alarm signals. A remote system may trigger an alarm based on the received alarm signals. The heat sensors may be placed at discrete locations within an interior of a building to monitor a condition of the infrastructure of the building. The remote system can include a communications module for receiving the signal and transmitting an alarm signal to an associated fire panel. The fire panel may analyze the signal, as well as signals generated from adjacent sensors, to determine whether a fire condition exists within a building. Appropriate notification devices may then be activated based on the determination. Other embodiments are disclosed and claimed.

18 Claims, 8 Drawing Sheets

SYSTEM AND METHOD FOR WIRELESS HEAT DETECTION

FIELD OF THE DISCLOSURE

This invention relates generally to systems and methods for sensing heat from objects or equipment, and more particularly to a system and method for detecting abnormal heat conditions in buildings.

BACKGROUND OF THE DISCLOSURE

Advancements in personal protective equipment (PPE) have enabled firefighters to operate and survive in relatively extreme conditions when fighting fires within a building. However, the personal protective equipment may not provide a firefighter with adequate protection when the firefighter is exposed to a structural failure within a building. In some cases, structural failures can trap the firefighter within a building and/or can seal off potential exit paths.

To determine if a building is becoming unstable, firefighters generally use a variety of physical observations. For example, firefighters may rely on physical observations of the building such as observing bowed walls or feeling for softness in a floor area. Such physical observations, however, may be unreliable and are often limited by the physical signs that are visible to the firefighters. As a result, firefighters may lack knowledge of a potential structural failure which may result in the firefighter being injured, or to run out of air after becoming entangled or disoriented as an indirect result of a structural collapse.

Electrically connected heat sensors may be used. Such sensors are expensive, however, which limits their widespread application. In addition, the size and wiring required for such head sensors may make it impractical to install such sensors on trusses, cross-members, and beams in sufficient quantity to detect when dangerous heat impinges on the structural members. Battery powered sensors may be used for applications in which it is impractical to use wired sensors (due to the presence of moving parts which make it difficult to maintain electrical connections). Current battery operated devices may also be undesirable, however, because batteries typically require replacement at periodic time intervals (6 months, 1 year). Even for cases in which a battery may last extended periods (up to 7+ years) current battery powered devices still can be undesirable because the sensor may be disposed in a location that is difficult to access in order to change the battery.

SUMMARY

A system and method are disclosed for monitoring heat conditions at various locations within a building to determine whether structural elements of the building are subject to integrity-affecting heat conditions. Such a system and method can be inexpensive enough to enable mounting to a large number of structural surfaces within a building. It can be easy to install, and can provide for real time monitoring of heat conditions to which structural members of a building are exposed.

A heat sensor is disclosed, comprising a thermoelectric power component for receiving heat energy and for transforming the heat energy to electric power, and a transmitting circuit coupled to the thermoelectric power component to receive the electric power therefrom to generate a wireless signal representative of a thermal condition of an object.

A temperature monitoring system is disclosed, comprising a sensor for converting received heat energy to electric power and for generating a wireless signal representative of a temperature of an object. The system also includes a communication module for receiving the wireless signal and for transmitting a corollary signal to a control module. The control module is configured to determine, from the corollary signal, if the temperature of the object is less than a predetermined alarm value, and to initiate an alarm when the temperature of the object is greater than the predetermined alarm value.

A method of monitoring an object is disclosed, comprising receiving, at a communication module, a wireless signal from a sensor, the wireless signal representative of a temperature to which the sensor is exposed; transmitting a corollary signal from the communication module to a control module of a fire panel, the corollary signal representative of the wireless signal received from the sensor; at the control module, processing the corollary signal received from the communication module to determine if an alarm condition exists at a monitored location associated with the sensor; and generating an alarm when the control module determines that the alarm condition exists.

A structural failure alert system is also disclosed. The system includes a structure failure sensor configured to be positioned within a building. The sensor is positioned and configured to monitor a local temperature of the building and to generate a signal based thereon. The sensor is further configured to convert heat energy representative of said local temperature to a wireless (e.g., radio frequency (RF), optical, or infrared) signal.

BRIEF DESCRIPTION OF THE DRAWINGS

By way of example, a specific embodiment of the disclosed device will now be described, with reference to the accompanying drawings, in which.

DETAILED DESCRIPTION

A system and method are disclosed for enabling early detection of fires in buildings. The system and method can also be used to detect high heat conditions that occur prior to a fire condition (i.e., prior to ignition temperature of an associated structure). The system and method can further be used to predict failure of structural members in buildings that are subject to high heat conditions during a fire. A plurality of sensors can be disposed at a variety of locations on building structural members. The sensors may be configured to convert energy from heat (i.e., fire) to wireless signals that can be received by an antenna associated with a communication module. The antenna and communication module can transmit the received information to a fire panel, which notifies operators and building occupants that structural elements of a building are being subjected to high heat conditions.

Figure 1:
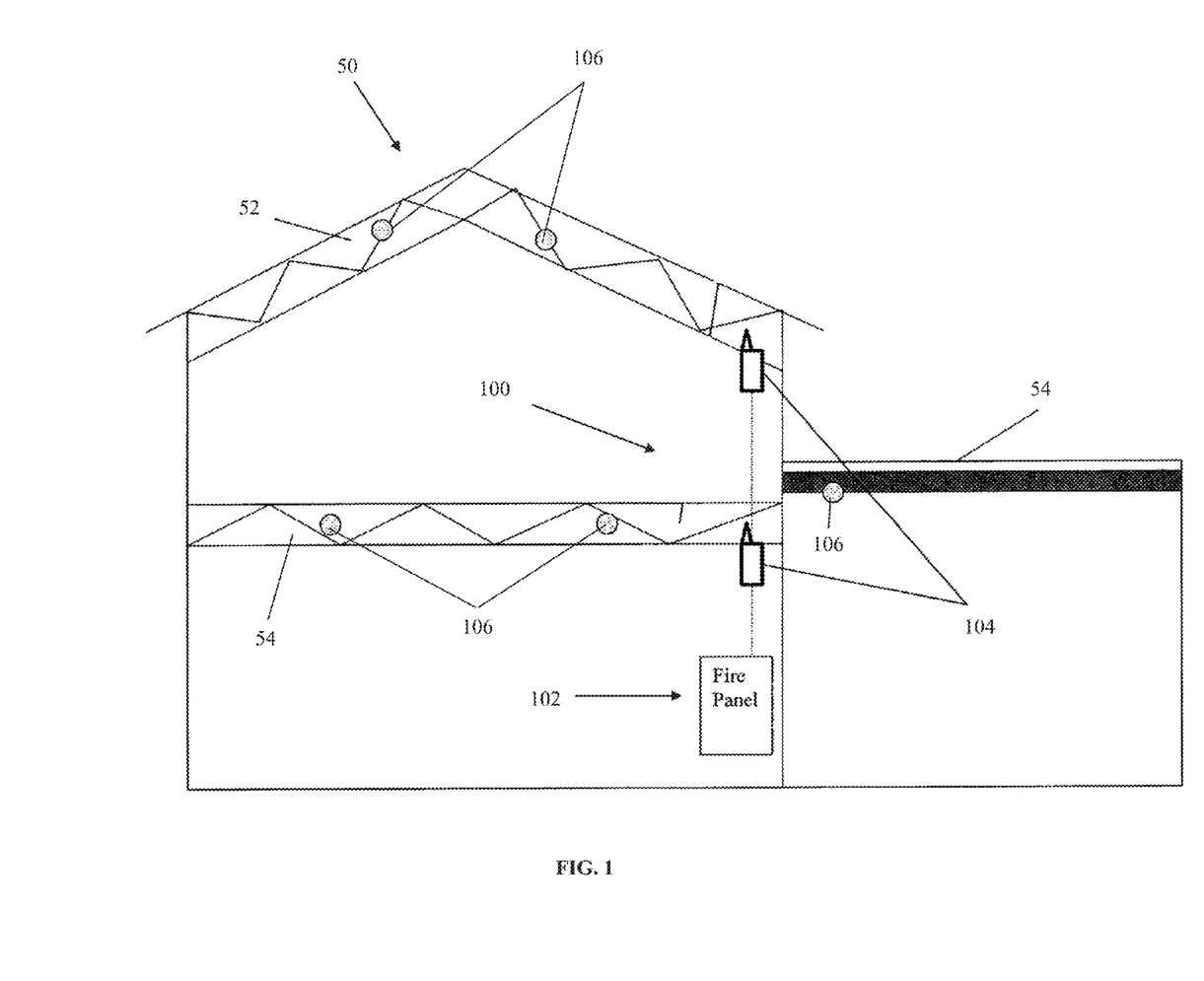
FIG. 1 is a schematic illustration of a building including an exemplary structural failure alert system.

FIG. 1 shows a building 50 including an exemplary alert system 100. Generally, the system 100 includes a fire panel 102, a plurality of communications modules 104, and a plurality of wireless heat sensors 106. The wireless heat sensors 106 can be disposed on or near load bearing structures of the building, for example, roof trusses 52 and floor trusses 54.

In use, the wireless heat sensors 106 send a wireless signal to an associated communications module 104 when a local high-heat condition is sensed. The communications module 104, in turn, sends a signal to the fire panel 102 which initiates one or more audible or visual alarms to alert occupants of the building 50, namely firefighting personnel, that a fire exists or that a structural failure may be imminent.

Heat sensors 106 are coupled at various locations within building 50. For example, heat sensors 106 may be coupled to any of the roof trusses 52, floor trusses 54, and/or walls 56. In one embodiment, the heat sensors 106 are positioned at various predetermined locations within the structure 50 wherein a structural failure is most likely to occur during a fire condition. For example, in the illustrated embodiment, the heat sensors are coupled to adjacent roof trusses 52 and floor trusses 54 to facilitate determining a structural failure. Although building 50 is shown as having two separate levels, it should be realized that the alert system 100 described herein may be utilized in a building having a single level or more than two levels, for example a single family home, or optionally, a high rise building.

The building 50 may be constructed utilizing any of a variety of wooden, metallic or composite materials without limiting the scope of the invention. As such, when subjected to high heat or fire conditions, the roof and floor trusses 52 and 54 may experience structural failure under differing load conditions or at different temperatures. The system 100 can discern between these different materials to provide a structure-customized alert indication when the potential for a structural failure exists within building 50.

Although the alert system 100 is described as employing heat sensors 106 coupled to roof and floor trusses 52, 54, it will be appreciated that sensors 106 can be provided at any of a variety of locations within building 50, including non-structural locations such as walls, ceilings, and the like.

Figure 2:
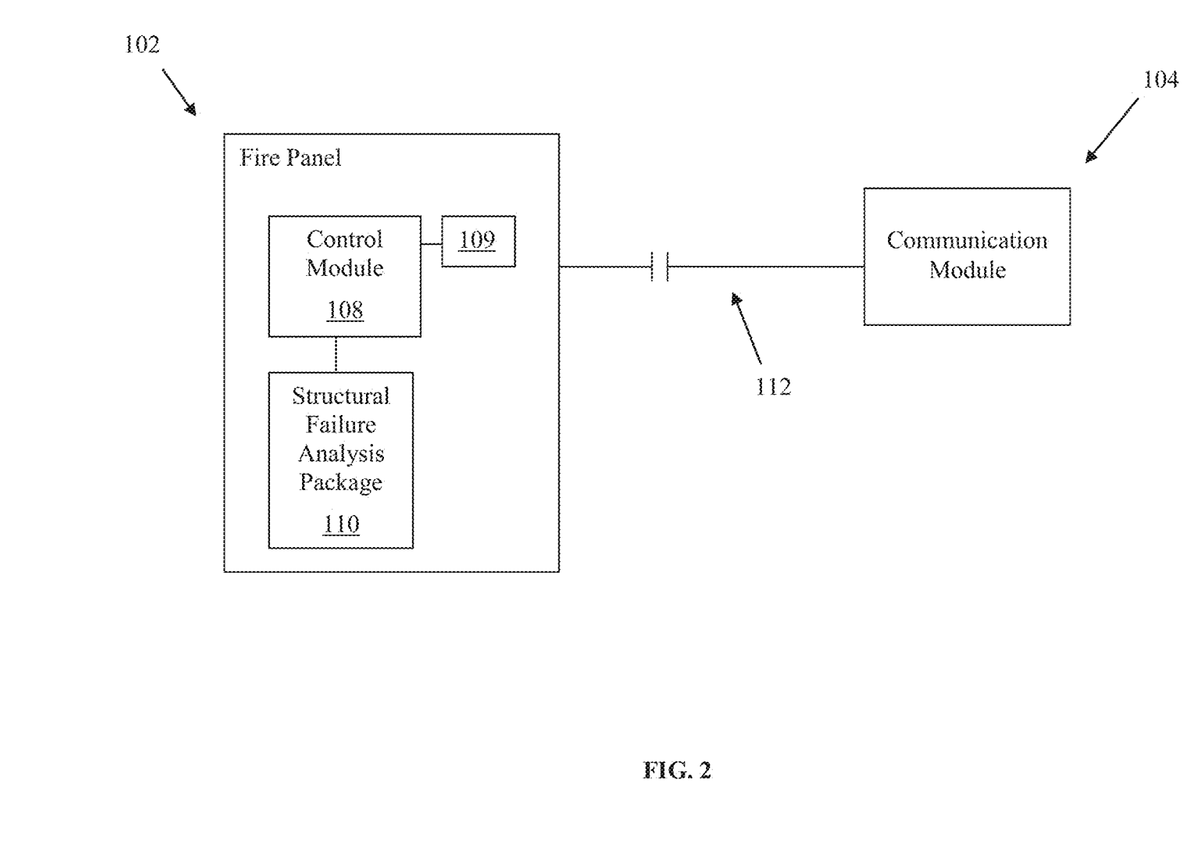
FIG. 2 is a schematic illustration of a fire panel and antenna and communication module of the system of FIG. 1.

FIG. 2 is a schematic illustration of a portion of the alert system 100. Specifically, fire panel 102 is shown including a control module 108 and a structural failure analysis package 110. As will be described in greater detail later, the structural failure analysis package 110 enables distinctions to be made between specific heat sensors 106, their placement locations in the building 50, and the type of structure to which they are attached. The control module 108 can then use this information to instruct appropriate audio and/or visual alerts.

A communication link 112 couples the fire panel 102 to one or more communication modules 104. The communication link 112 can be any of a variety of hard wired and wireless links. For example, the communication link 112 can be a PSTN (Public Switched Telephone Network), a cellular network such as, for example, a GSM (Global System for Mobile Communications) network for SMS and packet voice communication, General Packet Radio Service (GPRS) network for packet data and voice communication, or a wired data network such as, for example, Ethernet/Internet for TCP/IP, VOIP communication, RS232, and RS485. A non-limiting listing of exemplary wireless link types includes AM, FM, IEEE 802.11, IEEE 802.15. Where a clear visible path exists between one or more of the sensors 106 and the communication module 104, the communication link 112 could be an optical link employing an infrared (IR) or a video-enabled sensor in lieu of, or in addition to, an antenna.

Figure 3:
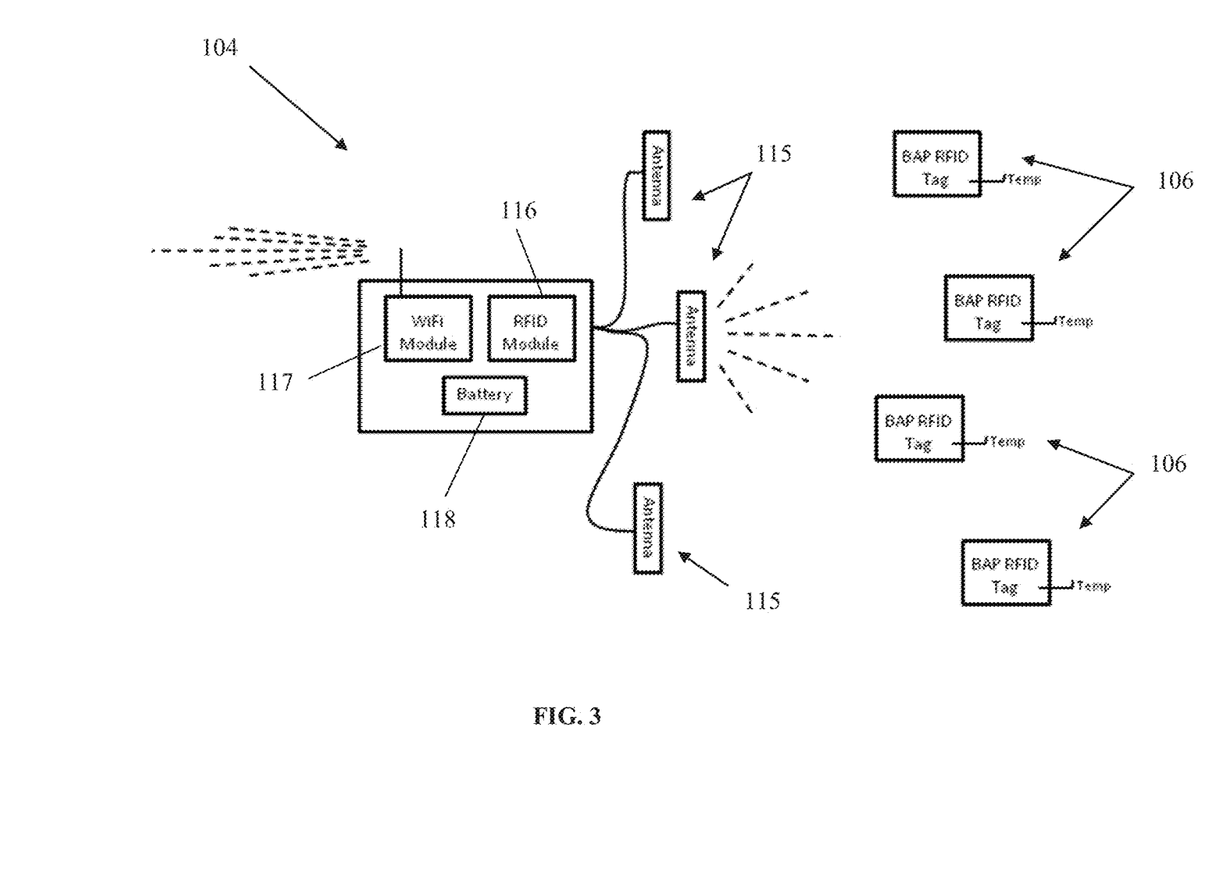
FIG. 3 is an exemplary antenna and communication module of the system of FIG. 1.
Figure 4:
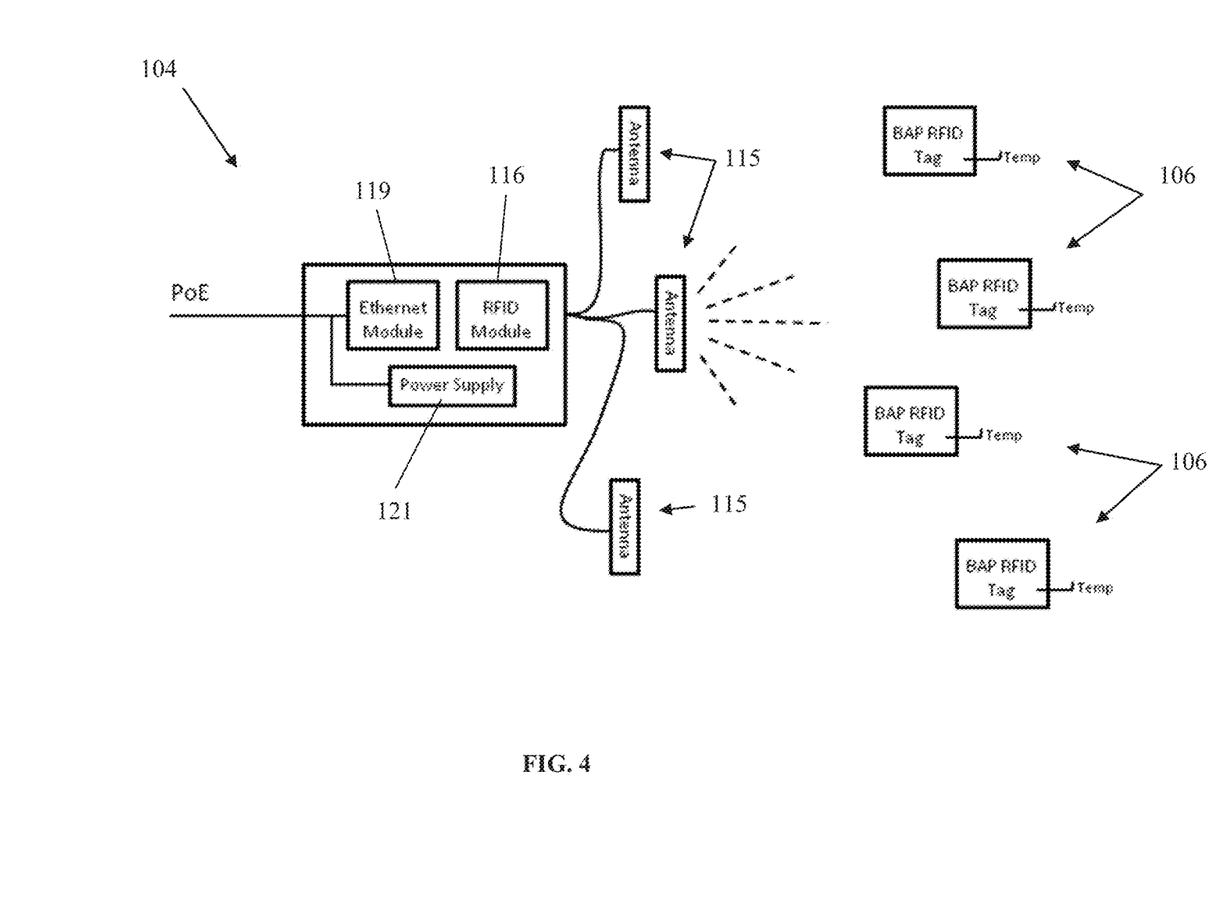
FIG. 4 is an alternative antenna and communication module of the system of FIG. 1.

FIGS. 3 and 4 are schematic illustrations of two exemplary embodiments of the communication module 104 portion of the alert system 100. In the FIG. 3 embodiment, the communication module 104 is configured to wirelessly communicate with the fire panel 102. The communications module 104 includes a plurality of antennas 115, an RFID module 116, a Wi-Fi module 117 and a battery 118. In the FIG. 4 embodiment, the communication module 104 is hard wired to the fire panel 102 using Power over Ethernet (PoE). Thus, the communications module 104 of this embodiment includes a plurality of antennas 115, an RFID module 116, an Ethernet module 119 and a power supply 121.

Thus arranged, when the sensors 106 are exposed to heat, the heat energy is converted to electrical energy to drive the sensor 106 to transmit a wireless signal. That wireless signal is received by the communication module 104, which in turn transmits the information to the fire panel 102, which notifies operators and building occupants that heat is impinging on structural elements within the building 50. As will be described in greater detail later, the signal sent by the individual sensors 106 may include information that enables the communication module 104 to determine the exact location of the sensor. This information, in turn, can be sent to the fire panel 102 so that a precise location of a fire or an impending structural failure can be provided to a user (i.e., occupant or fire fighting personnel).

In some wireless embodiments (FIG. 3), the communications module 104 may not include an RFID module or a WiFi module. While such embodiments may not provide a communications module 104 with the same level of information from a signaling sensor 106 as compared to RFID or WiFi enabled embodiments, they can still provide sufficient information to identify a general area in which a fire or high-heat condition exists. In this case, the communications module 104 may include a "dumb" transmitter in which a signal would be transmitted to the fire panel 102 when a signal from a sensor 106 is received by the module 104. Since the generic signal would not include any sensor-specific data, the mere fact that the module 104 is transmitting a signal indicates to the fire panel 102 that an alarm condition exists. Also, since no data is transmitted with the signal, the specific location of the alarm may only be identified as being proximal to the particular communications module 104. In one embodiment, the transmitter can use a clock and an antenna to generate a signal at a predetermined frequency that is monitored by the fire panel 102. In such a case, the mere presence of a signal at that frequency would indicate to the fire panel 102 that the transmitter has been activated, and that a fire or other high-heat condition exists in a sensor 106 associated with the particular communications module 104 containing that transmitter.

In one embodiment, the heat sensor 106 is a battery assisted passive (BAP) RFID tag, and the communication module 104 includes an RFID reader/antenna system. In contrast to conventional fully passive RFID tags which generally have a practical communications range of less than 10 ft, and often less than 5 feet (depending on tag antenna size and complexity, and receiver antenna gain), BAP RFID tags can communicate much greater distances. With the BAP RFID arrangement, the RFID tag remains dormant (asleep) until it senses an incoming field of sufficient strength (field intensity) at the radio frequency to which the tag antenna is tuned. In the case of conventional fully passive RFID tags, the incoming field must have sufficient strength to energize the tag, and the tag draws all of its operating power from the field. In contrast, BAP RFID tags have an internal power source (i.e., battery) which provides most of the power for the tag when the tag is awake. When the tag senses the incoming field, it uses the battery to charge its power capacitor, the digital logic of the tag automatically starts operation (i.e., the tag circuit boots up,) and the tag's signal receiver begins to demodulate the incoming wave and search for meaningful data bits. In order to send data to the communication module 104, the tag "backscatters" the incoming RF field or wave by increasing and decreasing its load or field dissipation strength (usually by switching a resistive circuit on and off). For BAP RFID tags, this "reverse link" or tag-to-reader communication (i.e., the backscatter communication) is accomplished in exactly the same way as is done in the case of fully passive RFID tags. The ISO-18000-6D standard describes the physical layer protocol and logical states of the tag operation corresponding to one widely supported BAP RFID approach.

BAP RFID provides an advantage for use in sensors 106 because many BAP RFID chips on the market (such as those offered by EM-Microelectronics and NXP) offer built-in support for temperature sensing. The sensing function increases the power requirements of the RFID tag, as compared to simple fully-passive (ID only) RFID implementations, and the battery inherent in BAP RFID systems makes power management more practical in sensor-enabled RFID solutions.

Another advantage of using BAP RFID in sensors 106 is that the increased read range relative to conventional RFID greatly reduces the number of readers required to implement the disclosed temperature monitoring solution. In addition, using BAP RFID may enable the use of a simple thermocouple in lieu of an energy harvesting module (to be described in greater detail below) while still maintaining desired transmission distances.

In the embodiment illustrated in FIG. 3, the communication module 104 communicates with the fire panel 102 using WiFi (IEEE 802.11a/b/g) technology. In this embodiment, the communication module 104 would use a relatively large battery 118 (i.e., AA or 9V battery) and a relatively low duty cycle (e.g., one RFID read every few minutes) to make sure that the battery life is extended (i.e., up to several years). In the embodiment illustrated in FIG. 4, the communication module 104 may use PoE (power over Ethernet) technology to combine the fire panel data communications and communication module power supply in one physical cable.

As shown in FIGS. 3 and 4, multiple RFID antennas 115 can be connected to a single communication module 104. Various alternatives to this antenna multiplexing are well known to those familiar with the state of the art, and include various forms of addressable ("smart") switches which involve the remote control of switch settings which are used to connect a particular antenna to a particular RFID reader. An example of such advanced antenna multiplexing for RFID is disclosed in U.S. Patent Application Publication No. 2009/0009296 to Mark Shafer, titled "Rf Switched Rfid Multiplexer," the entirety of which application is incorporated herein by reference.

Figure 5:
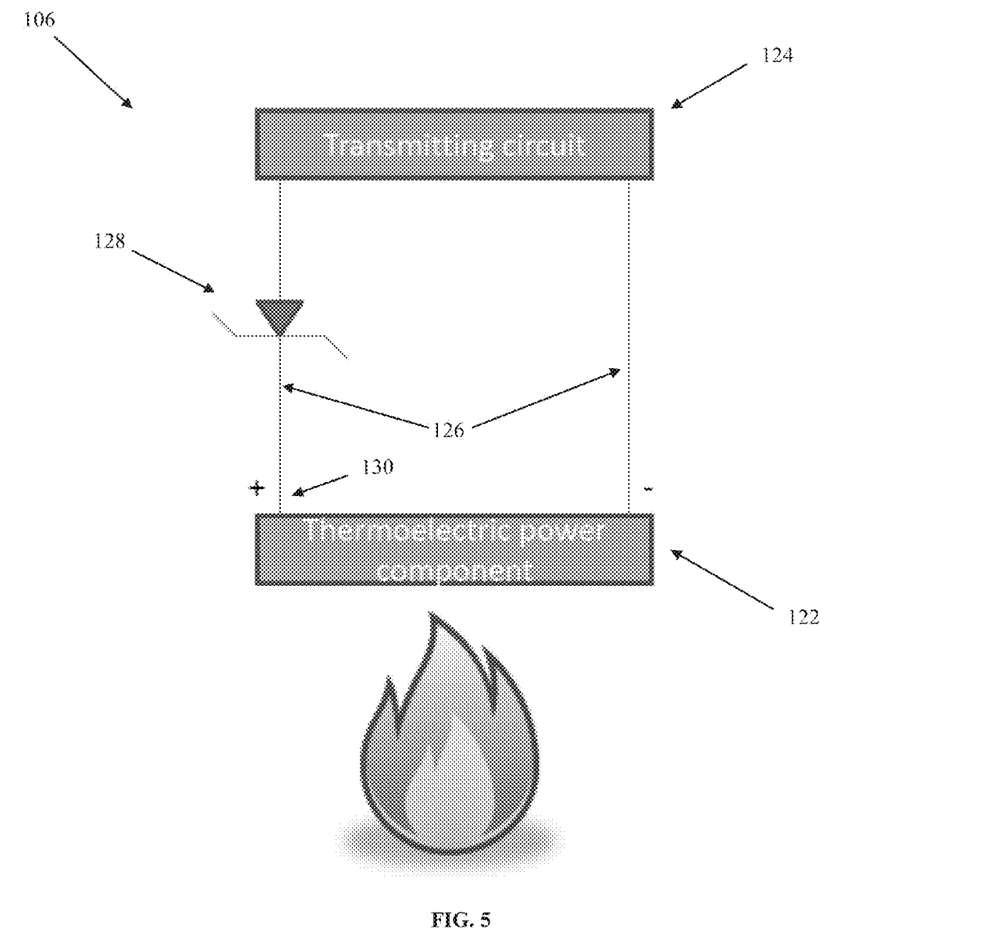
FIG. 5 is an exemplary sensor circuit for use with the system of FIG. 1.

Referring now to FIG. 5, an exemplary heat sensor 106 for use in alert system 100 is shown. The sensor 106 includes a thermoelectric power component 122 electrically coupled to a transmitting circuit 124 via wires 126. In one non-limiting exemplary embodiment, the thermoelectric power component 122 may be a TG12-6-01L power generator, manufactured by Marlowe Industries, Inc., 10451 Vista Park Rd, Dallas, Tex. 75238. As will be appreciated, the thermoelectric power component 122 generates electric power when exposed to heat. The more heat applied to the component 122, the more electric power is generated. A zener diode 128 is coupled between the positive terminal 130 of the thermoelectric power component 122 and the transmitting circuit 124. In this embodiment, power generated by the thermoelectric power component 122 is prevented from reaching the transmitting circuit 124 until the voltage reaches the diode's threshold. In one non-limiting exemplary embodiment, the threshold may be 3 Volts at 500 degrees Celsius. Once the voltage reaches the diode's threshold, the transmitting circuit 124 is energized and sends a signal to the communication module 104, which indicates that a high heat condition exists at or near the sensor 106. As will be appreciated, careful selection of the diode's threshold enables the sensor 106 to be designed to provide a signal at a desired temperature. Although not illustrated, further signal conditioning circuitry could also be employed as part of the transmitting circuit 124.

Figure 6:
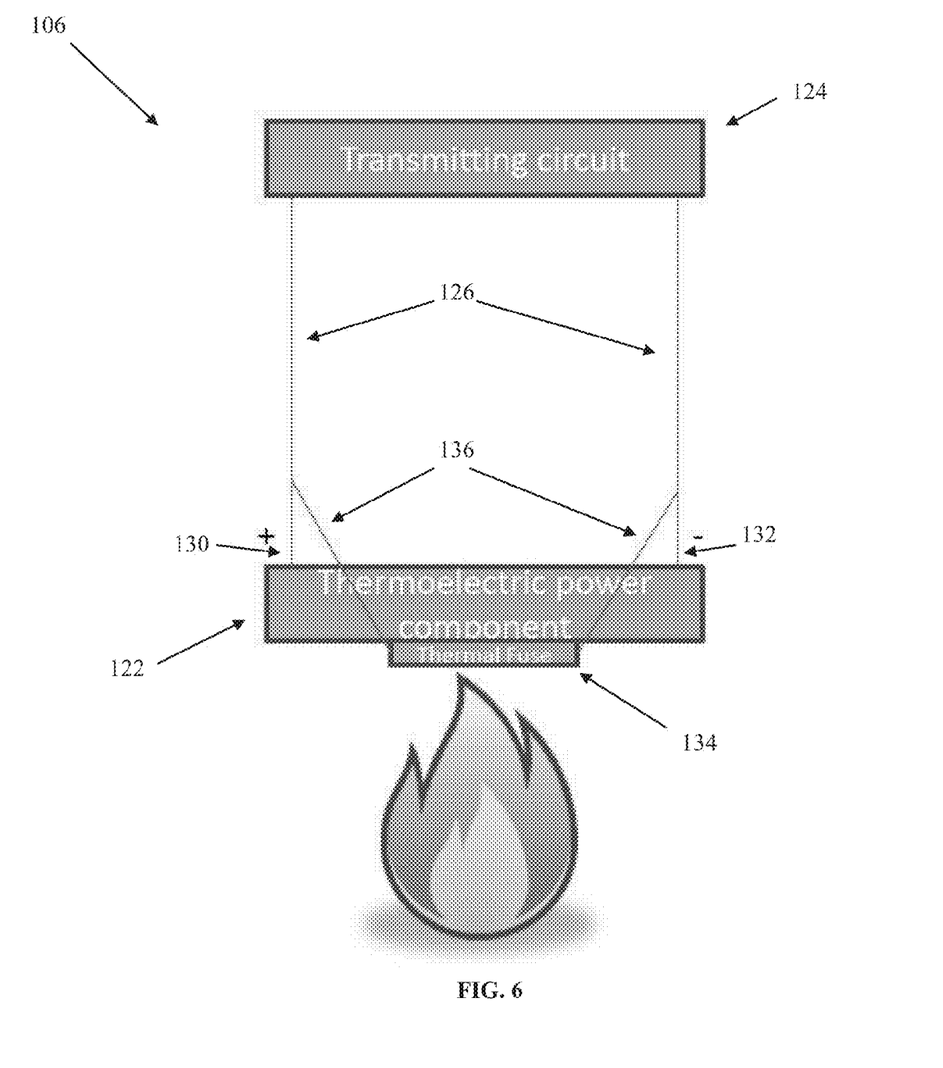
FIG. 6 is an alternative sensor circuit for use with the system of FIG. 1.

FIG. 6 shows details of an alternative heat sensor 106, which includes a thermoelectric power component 122 (similar to that of FIG. 5) that is electrically coupled to a transmitting circuit 124 via wires 126. In this embodiment, the positive and negative terminals 130, 132 of the thermoelectric power component 122 shorted via a fuse 134. As such, the power generated by the thermoelectric power component 122 is dissipated until the fuse threshold is exceeded. In one non-limiting exemplary embodiment, the fuse may open at 500 degrees Celsius. Once the fuse's threshold is exceeded (i.e., the fuse "blows"), power is provided to the transmitting circuit 124, energizing the circuit and sending a signal to the communication module 104, which indicates that a high heat condition exists at or near the heat sensor 106. In one embodiment, the fuse may be self-resetting once it cools to a temperature below its threshold. Alternatively, the fuse (and the associated sensor 106) could be disposable.

In one embodiment, instead of sensing an actual fire condition, one or more of the heat sensors 106 send a signal to the communication module 104 when a relatively low temperature is detected (i.e., a temperature that is higher than normal ambient temperature, but that is less a temperature associated with a structure fire). The communication module 104, in turn, may then determine whether similar signals have been received from one or more adjacent heat sensors 106. The absence of similar such signals from adjacent sensors within a predetermined time period may cause the communication module 104 to ignore the signal. In such cases, if no such signals have been received from immediately adjacent sensors, the communication module may place the reporting sensor on a list of heat sensors 106 that should be checked for malfunction.

The system 100 may be programmed to ignore signals representative of relatively low temperatures (less than fire temperatures). Alternatively, the system 100 may obtain historical data to provide a user with useful information regarding heating/cooling of the structure. In one example, the system 100 may determine that temperatures in a particular region of the structure are abnormally high due to poor ventilation. Such information may then be used by the building owner to reduce overall building heating/cooling costs.

The signals generated by heat sensors 106 may be transmitted by the communication module 104 to the control module 108 of the fire panel 102 where the signals can be analyzed to determine the likelihood that an actual or potential structural failure exists using failure analysis package 110. In one embodiment, control module 108 is a processor, and failure analysis package 110 is a program stored on and/or executed by the control module 108 to determine the likelihood that an actual or potential structural failure exists based on the signals received from at least one heat sensor 106. An exemplary structural failure analysis package is disclosed in U.S. Patent Application Publication No. 2006/0202844, titled "Structure Failure Alert System," to Daniel Farley, the entirety of which is incorporated by reference herein.

For example, the failure analysis package 110 may analyze the data transmitted by structure failure sensors 106 and, based on one or more predetermined criteria, may determine that an actual structural failure has occurred or may predict that a structural failure is imminent within building 50. In an exemplary embodiment, the predetermined criteria may include a priori knowledge of building 50 that includes the various locations in which the sensors 106 are installed and the known temperatures at which the steel trusses, wooden trusses and/or walls begin to rapidly lose their strength resulting in the walls and/or trusses either warping and/or failing.

As such, the failure analysis package 110 can continuously monitor data received from the sensors 106 and can compare the received data to the a priori knowledge to predict a structural failure within building 50, or to determine that a structural failure has already occurred. Specifically, the signals transmitted from each heat sensor 106 are received by control module 108 via communications module 104. Control module 108 compares the received signals to the predetermined criteria, e.g., the a priori knowledge, to determine if any of the received signals meets or exceeds the predetermined criteria. If at least one of the received signals meets or exceeds the predetermined criteria, that is, the temperature within the building 50 is approaching a value representative of a fire condition, or of a condition in which at least a portion of the structure will begin to lose strength. In turn, the control module 108 generates a signal indicating the location of the potential fire or structural failure. The control module 108 instructs the fire detection panel 102 to generate at least one of an audio and/or visual indication notifying an occupant or firefighter that a fire exists, or that a portion of building 50 may be subject to a structural failure. In operation, the fire panel 102 can command the communication device 120 (FIG. 1) to emit an audio and/or visual indication of a predicted and/or actual fire or structural failure. In one embodiment, the fire panel 102 activates a device such as, but not limited to, a strobe light or an audio device.

In an exemplary embodiment, communication device 120 may be a speaker that emits an audio signal that is different than audio an audio signal generated by a standard fire alarm. Alternatively, communication device 120 may be a visual indicator, (e.g. flashing lights), positioned at various locations within building 50, a visual indication that is observable at the fire panel 102, and/or a signal may be transmitted directly to a communication device carried by the firefighter. The fire panel 102 may also transmit a signal to remote locations outside building 50 to facilitate notifying firefighters that a fire or structural failure has (or may) occur within the building. In one embodiment, the fire panel 102 transmits a signal to a remote monitoring station.

Figure 7:
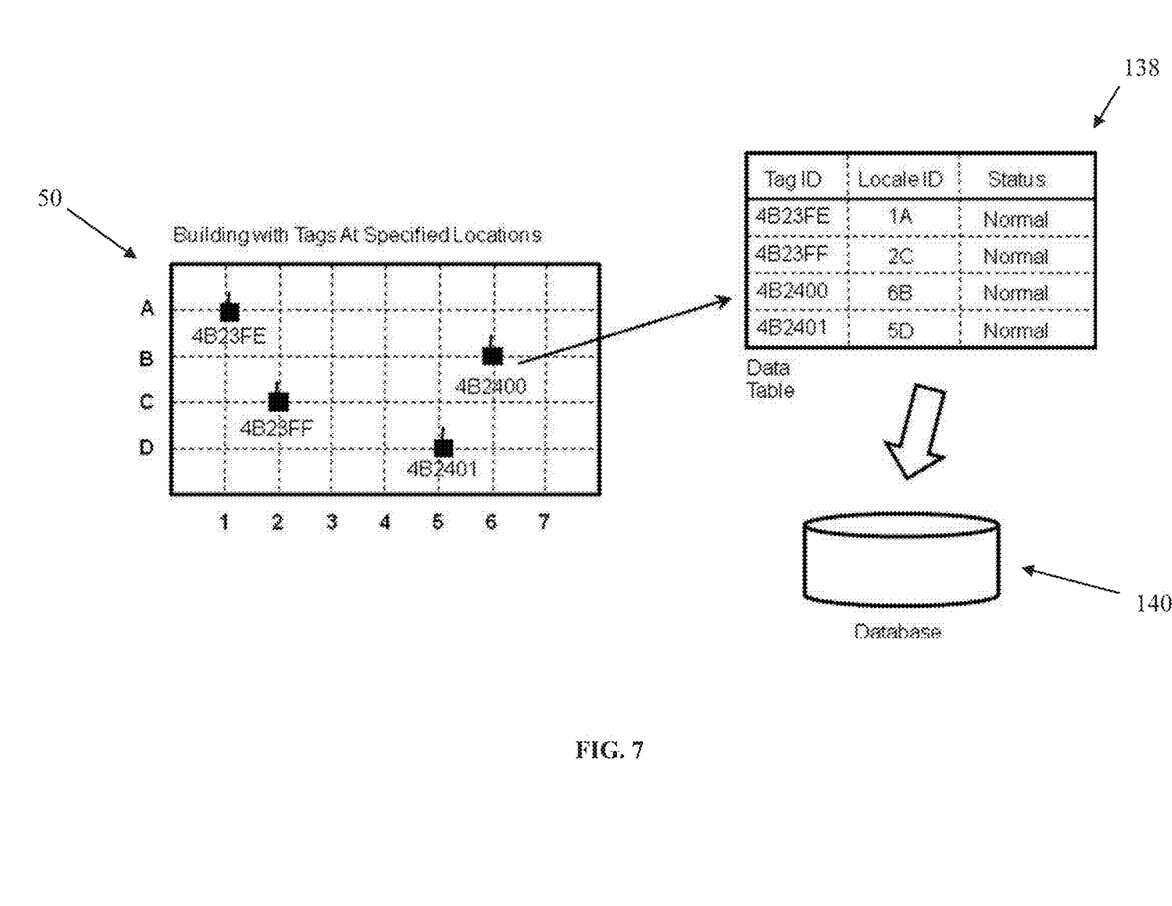
FIG. 7 is a schematic of a sensor identification database for use with the system of FIG. 1.

FIG. 7 shows an embodiment of the system 100 in which heat sensors 106 are placed in various locations of the building 50, and those locations (i.e., the tag ID number associated with the sensor 106 and the sensor's location in the building as specified by a coordinate system, hereafter referred to as the locale ID) are cross-referenced in a data table 138 contained in a database 140. In one embodiment, the database comprises non-volatile memory 109 associated with the control module 108. If the temperature experienced by a particular sensor temperature exceeds a pre-programmed threshold, the heat sensor 106 sends an alarm message during the next read by the RFID module 116 of the control module 104. The control module 104 can then report the alarm condition along with the tag ID to the structural failure analysis package 110 or another software application running on the control module 108 or a server (which may be directly connected to the network of RFID readers in the building 50, or may be able to access the RFID reader via the internet). The structural failure analysis package 110 or software application can accesses the database 140 and identify the building locale associated with the tag ID number reported in the alarm message from the communication module 104. The structural failure analysis package 110 or software application then issues an appropriate report or publishes the alarm condition. In some embodiments, the polling frequency of the RFID 116 module may be adjusted (i.e., increased) once an event has been reported by one or more heat sensors 106.

In some embodiments, the sensor 106 may simply transmit an alarm message without a tag ID number when subjected to a high heat condition. In such cases, the control module 108 would not be able to determine the precise location of the alarming sensor. Approximate location could, however, be determined as being proximate to a particular communication module 104 (i.e., the one transmitting the sensor's signal to the control module 108). Location could also be determined as being proximate to the location of the antenna which received the strongest signal.

In another embodiment, a software application (which, in one example is a server application) maintain a list of communication modules 104 which it is tasked with monitoring. The server application periodically polls each of these communication modules 104 in order to determine whether any sensors 106 associated with the communication module 104 are experiencing an alarm (i.e., high temperature) condition. The server application can then publish a web service update to alert one or more subscribing server applications running elsewhere (at any location in the world with web access) of the alarm condition, along with details of the alarm (building name and location, locale inside the building, time of alarm, etc.).

Figure 8:
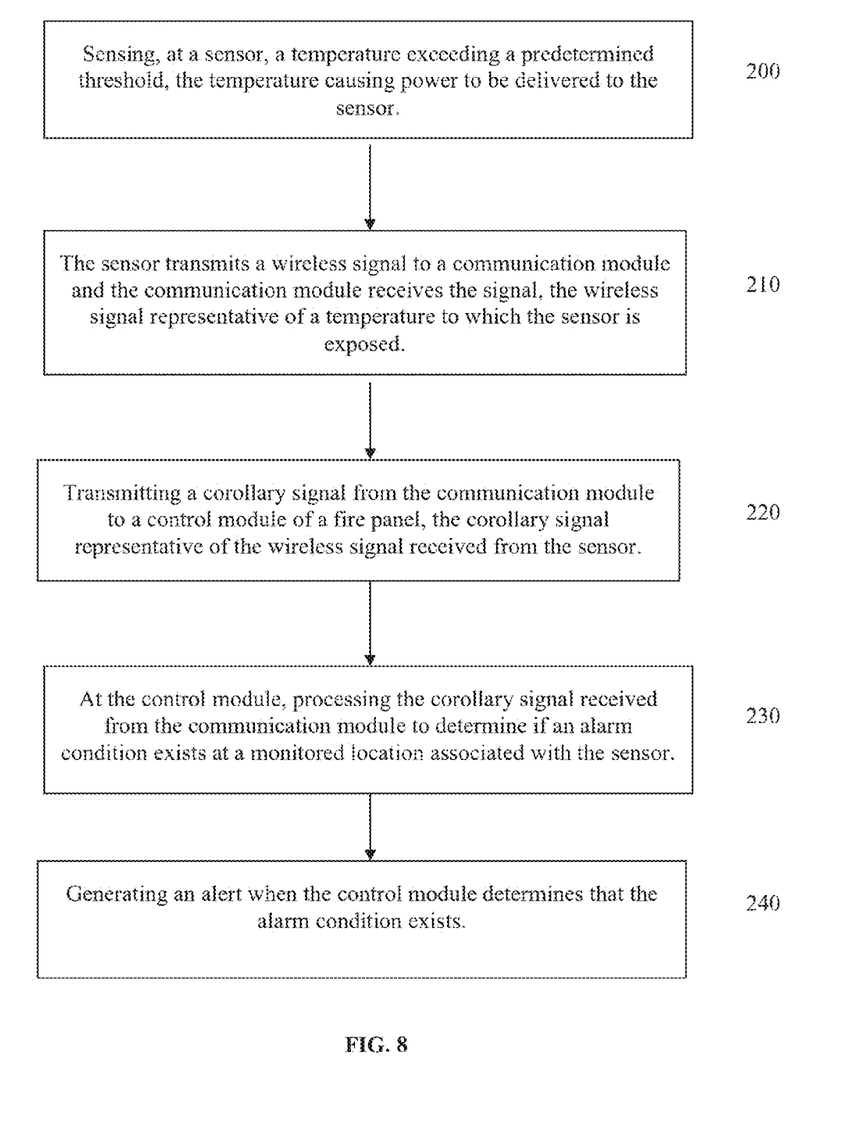
FIG. 8 is a flow chart illustrating an exemplary method of operating the structural failure alert system of FIG. 1.

Referring now to FIG. 8, a method of using the disclosed system 100 will be described in greater detail. At step 200, a sensor 106 senses a temperature exceeding a predetermined threshold, the temperature causing power to be delivered to the sensor 106. At step 210 the sensor 106 transmits a wireless signal to a communication module 104, and the communication module receives the wireless signal, the signal being representative of the temperature to which the sensor is exposed. In one embodiment, the sensor 106 is attached to a floor or roof truss of a building 50. At step 220, the communication module 104 transmits a corollary signal to the control module 108 of the fire panel 102. The corollary signal is representative of the wireless signal received from the sensor 106. At step 230, the control module processes the signal received from the communication module 104 to determine if an alarm condition exists at the location in which the sensor 106 is installed. If an alarm condition is determined to exist, then at step 240 an audio and/or visual alarm is provided to indicate to a building occupant for firefighting personnel that a fire exists, or that a portion of a building may be subject to an imminent structural failure.

The above-described embodiments of a fire detection system and upgrade each provide a cost-effective and reliable means for determining a structural collapse within a building. Specifically, a failure analysis package is loaded into a fire detection panel permanently installed within the building. The failure analysis package receives inputs from various sensors permanently installed within the building and based on the information received from the sensors, the failure analysis package instructs the fire detection panel to transmit and audio or visual indication to the firefighters that a structural failure has or may occur.

Although the disclosed sensors 106 and communication module 104 are disclosed for use with a fire panel 102 in predicting failure of one or more structural components, it will be appreciated that the invention is not so limited. For example, the disclosed sensor/communication module arrangement may find use in monitoring any object for the existence of a high heat condition. For example, the disclosed arrangement could be used to monitor bearings in pulleys and moving parts that are subject to overheating. Overheating in such parts can easily result in a fire. The disclosed sensors can be attached to a variety of rotating parts of machinery to provide an early warning of overheating condition. In such applications, the disclosed sensors provide substantial benefit over conventional wired sensors.

As will be appreciated, the disclosed system provides an advantage compared to prior systems in that it enables a structure to be fit with a greater number of sensors, due to the small size and lack of wiring. Providing greater sensing coverage may enable faster identification of a fire. It may also enable users who otherwise could not afford prior systems to implement this lower-cost system in their building structures.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features. The term computer is not limited to just those integrated circuits referred to in the art as computers, but broadly refers to, microprocessors, microcontrollers, microcomputers, programmable logic controllers, application specific integrated circuits, and other programmable circuits, and these terms are used interchangeably herein.

Exemplary embodiments of fire detection systems and apparatus are described above in detail. The fire detection system components illustrated are not limited to the specific embodiments described herein, but rather, components of each system may be utilized independently and separately from other components described herein. For example, the fire detection system components described above may also be used in combination with different fire detection system components.

Some embodiments of the disclosed device may be implemented, for example, using a storage medium, a computer-readable medium or an article of manufacture which may store an instruction or a set of instructions that, if executed by a machine, may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto

The invention claimed is:

1. A temperature monitoring system, comprising:
    a sensor for converting received heat energy to electric power and for generating a wireless signal representative of a temperature of an object, the sensor comprising a thermoelectric power component coupled to a transmitting circuit, the thermoelectric power component for receiving heat energy and for transforming the heat energy to electric power, the transmitting circuit for receiving the electric power from the thermoelectric power component for generating the wireless signal, the transmitting circuit configured to prevent electric energy below a predetermined threshold from being received by the transmitting circuit, the predetermined threshold corresponding to a predetermined temperature of the object; and
    a communication module for receiving the wireless signal and for transmitting a corollary signal to a control module;
    wherein the control module is configured to determine, from the corollary signal, if the temperature of the object is less than a predetermined alarm value, and to initiate an alarm when the temperature of the object is greater than the predetermined alarm value; and
    wherein the control module is disposed in a fire panel.

2. The temperature monitoring system of claim 1, further comprising a structural failure analysis package associated with the control module, the structural failure analysis package including predetermined failure criteria about a structure in which the temperature monitoring system is installed, wherein the control module is configured initiate a structural failure alarm when the corollary signal satisfies the predetermined failure criteria.

3. The temperature monitoring system of claim 1, wherein the communication module includes a wireless module for transmitting the corollary signal to the control module.

4. The temperature monitoring system of claim 1, the transmitting circuit including a diode for preventing electric energy below a predetermined threshold from being received by the transmitting circuit.

5. The temperature monitoring system of claim 1, wherein the wireless signal is selected from the list consisting of radio frequency (RF), infrared (IR) and optical.

6. A temperature monitoring system, comprising:
    a sensor for converting received heat energy to electric power and for generating a wireless signal representative of a temperature of an object, the sensor comprising a thermoelectric power component coupled to a transmitting circuit, the thermoelectric power component for receiving heat energy and for transforming the heat energy to electric power, the transmitting circuit for receiving the electric power from the thermoelectric power component for generating the wireless signal, the transmitting circuit configured to prevent electric energy below a predetermined threshold from being received by the transmitting circuit, the predetermined threshold corresponding to a predetermined temperature of the object; and a communication module for receiving the wireless signal and for transmitting a corollary signal to a control module;

wherein the control module is configured to determine, from the corollary signal, if the temperature of the object is less than a predetermined alarm value, and to initiate an alarm when the temperature of the object is greater than the predetermined alarm value; and wherein the system includes a plurality of said sensors, each of said sensors associated with a discrete location in or on a monitored structure, the system further comprising a memory associated with the control module, the memory including a database identifying the discrete location of each of said sensors.

7. A temperature monitoring system, comprising:

a sensor for converting received heat energy to electric power and for generating a wireless signal representative of a temperature of an object, the sensor comprising a thermoelectric power component coupled to a transmitting circuit, the thermoelectric power component for receiving heat energy and for transforming the heat energy to electric power, the transmitting circuit for receiving the electric power from the thermoelectric power component for generating the wireless signal, the transmitting circuit configured to prevent electric energy below a predetermined threshold from being received by the transmitting circuit, the predetermined threshold corresponding to a predetermined temperature of the object; and a communication module for receiving the wireless signal and for transmitting a corollary signal to a control module;

wherein the control module is configured to determine, from the corollary signal, if the temperature of the object is less than a predetermined alarm value, and to initiate an alarm when the temperature of the object is greater than the predetermined alarm value; and wherein the sensor includes a radio frequency identification (RFID) tag for generating the wireless signal, and the communication module includes a plurality of antenna for receiving the wireless signal.

8. The temperature monitoring system of claim 7, wherein the RFID tag is a battery assisted RFID tag.

9. A method of monitoring an object, comprising:

generating a wireless signal from a battery assisted radio frequency identification (RFID) tag, the battery assisted RFID tag comprising a thermoelectric power component coupled to a transmitting circuit, the thermoelectric power component for receiving heat energy and for transforming the heat energy to electric power, the transmitting circuit for receiving the electric power from the thermoelectric power component and for generating the wireless signal;

receiving, at a communication module, a wireless signal from a sensor, the wireless signal representative of a temperature to which the sensor is exposed;

transmitting a corollary signal from the communication module to a control module of a fire panel, the corollary signal representative of the wireless signal received from the sensor;

at the control module, processing the corollary signal received from the communication module to determine if an alarm condition exists at a monitored location associated with the battery assisted RFID tag; and generating an alarm when the control module determines that the alarm condition exists; and wherein the electric power is prevented from being received by the transmitting circuit when the electric power is less than a predetermined threshold.

10. The method of claim 9, wherein the electric power is prevented from being received by the transmitting circuit using a fuse or a diode associated with the transmitting circuit.

11. The method of claim 9, further comprising, at the communication module, increasing a polling rate when an alarm condition is determined to exist at the monitored location.

12. The method of claim 9, further comprising, at the control module, processing the corollary signal received from the communication module to determine a location of the battery assisted RFID tag.

13. The method of claim 9, wherein the wireless signal is selected from the list consisting of radio frequency (RF), infrared (IR) and optical.

14. A heat sensor comprising:

a thermoelectric power component for receiving heat energy and for transforming the heat energy to electric power;

a transmitting circuit coupled to the thermoelectric power component to receive the electric power therefrom to generate a wireless signal representative of a thermal condition of an object, the transmitting circuit comprising an RFID tag, and a fuse coupled between the transmitting circuit and the thermoelectric power component, the fuse sized to prevent electric energy below a predetermined threshold from being received by the transmitting circuit, the predetermined threshold corresponding to a predetermined temperature of the object.

15. The heat sensor of claim 14, the wireless signal including information for identifying a placement location of the RFID tag.

16. The heat sensor of claim 14, wherein the RFID tag is a battery assisted RFID tag.

17. The heat sensor of claim 14, wherein the wireless signal is selected from the list consisting of radio frequency (RF), infrared (IR) and optical.

18. A temperature monitoring system, comprising:

a sensor for converting received heat energy to electric power and for generating a wireless signal representative of a temperature of an object, the sensor comprising a thermoelectric power component coupled to a transmitting circuit, the thermoelectric power component for receiving heat energy and for transforming the heat energy to electric power, the transmitting circuit for receiving the electric power from the thermoelectric power component for generating the wireless signal, the transmitting circuit configured to prevent electric energy below a predetermined threshold from being received by the transmitting circuit, the predetermined threshold corresponding to a predetermined temperature of the object; and a communication module for receiving the wireless signal and for transmitting a corollary signal to a control module;

wherein the control module is configured to determine, from the corollary signal, if the temperature of the object is less than a predetermined alarm value, and to initiate an alarm when the temperature of the object is greater than the predetermined alarm value; and wherein the transmitting circuit includes a fuse for preventing electric energy below a predetermined threshold from being received by the transmitting circuit.

* * * * *